United States Patent
Haglund

(10) Patent No.: US 6,971,718 B2
(45) Date of Patent: Dec. 6, 2005

(54) CHILD SAFETY SEAT

(75) Inventor: Lennart Haglund, Vargarda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/841,993

(22) Filed: May 7, 2004

(65) Prior Publication Data

US 2005/0012368 A1      Jan. 20, 2005

(30) Foreign Application Priority Data

May 8, 2003   (GB)   ................................. 0310630

(51) Int. Cl.[7] ........................... A47C 15/00; B60N 2/26
(52) U.S. Cl. ...................... 297/236; 297/237; 297/338
(58) Field of Search ............................ 297/250.1, 234, 297/236, 237, 115, 338, 339, 344.15

(56) References Cited

U.S. PATENT DOCUMENTS

| | | | | |
|---|---|---|---|---|
| 4,768,827 A | * | 9/1988 | Musgrove | 297/236 |
| 5,265,934 A | * | 11/1993 | Forget | 297/237 |
| 5,282,666 A | * | 2/1994 | Demick et al. | 297/237 |
| 5,609,392 A | * | 3/1997 | Stigson | 297/237 |
| 5,660,437 A | * | 8/1997 | Bauer et al. | 297/237 |
| 5,788,326 A | * | 8/1998 | Kawade et al. | 297/236 |
| 5,997,083 A | * | 12/1999 | Ono et al. | 297/237 |

FOREIGN PATENT DOCUMENTS

| | | |
|---|---|---|
| EP | 0 952 288 | 10/1999 |
| GB | 2 345 723 | 7/2000 |
| GB | 2 368 272 | 5/2002 |

* cited by examiner

Primary Examiner—Anthony D. Barfield
(74) Attorney, Agent, or Firm—Brinks Hofer Gilson & Lione

(57) ABSTRACT

A child safety seat is disclosed which is incorporated into the squab of a vehicle seat in which part of the squab can be moved to an elevated position. The child safety seat incorporates at least one latch to maintain two components of the seat in a predetermined relative position. One of those components carries the latch and the other component carries a latch pin configured to co-operate with the latch. The latch defines a channel between two side walls, the side walls being provided with recesses. The channel contains a pivotally-mounted latch element which defines a recess. The latch element is movable pivotally between a first position in which the recess therein defines a mount accessible by the latch pin to enable the latch pin to be inserted into the recess in the latch element and being movable to a retaining position in which the latch pin, retained in the recess in the latch element, is retained in the recesses formed in the side walls of the channel. A releasable mechanism is provided to retain the latch element in its retaining position.

8 Claims, 5 Drawing Sheets

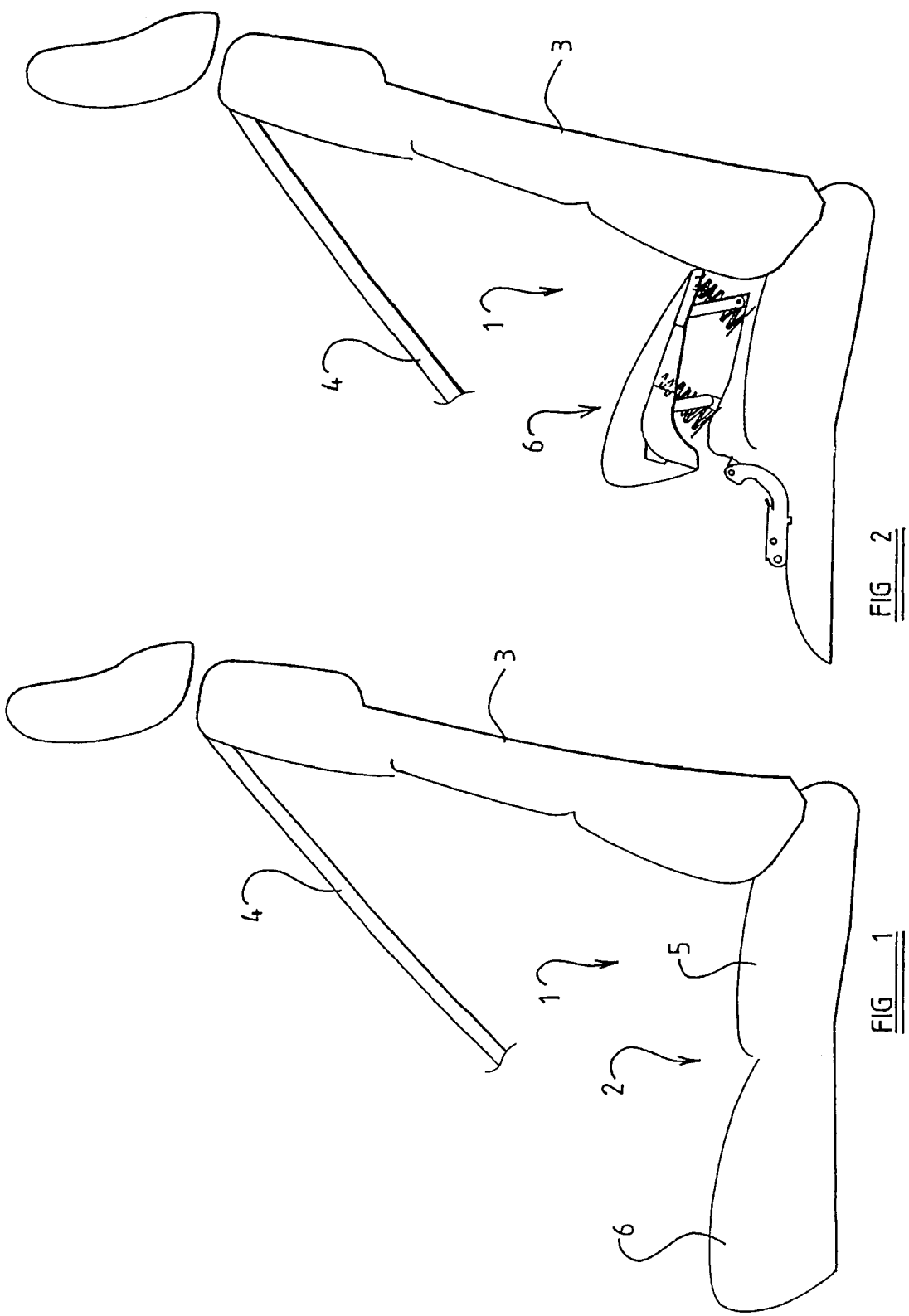

CHILD SAFETY SEAT

CROSS REFERENCE TO RELATED APPLICATION

This application claims priority to GB 0310630.9 filed May 8, 2003 which is currently pending.

BACKGROUND OF THE INVENTION

The present invention relates to a child safety seat. It has been proposed previously to provide a child safety seat for use in a motor vehicle, the child safety seat incorporating a squab which is initially an element forming part of the main squab or the back rest of the seat. The squab of the child seat is moveable upwardly from an initial position, in which the back seat of the vehicle may be used by an adult, to an operative position, in which the back seat of the vehicle is prepared for use by a child.

A safety seat of this type is disclosed in GB-A-2368272.

It is most desirable that whenever the squab of the child is in a predetermined position, either the lowered inoperative position or the raised operative position, the squab should be retained in that position in such a way that it cannot inadvertently move to the other position, even if an accident should occur.

The present invention seeks to provide an improved child safety seat.

According to the present invention, there is provided a child safety seat, the child safety seat being incorporated in the squab of the vehicle seat and having a part of the squab which can move to an elevated position, the child safety seat incorporating at least one latch to maintain two components of a seat in a predetermined relative position, one component carrying the latch and the other component carrying a latch pin to co-operate with the latch, the latch defining a channel between two side walls, the side walls being provided with recesses therein, the channel containing a pivotally mounted latch element, the latch element defining a recess therein, the latch element being moveable pivotally between a first position in which the recess therein defines a mount accessible, by the latch pin, to enable the latch pin to be inserted into the recess in the latch element and being moveable to a retaining position in which the latch pin, still retained in the recess in the latch element, is retained in the recesses formed in the side walls of the channel, a releasable mechanism being provided to retain the latch element in the retaining position, the release mechanism incorporates a plunger moveable against a resilient bias traversely of the axis of the channel, the plunger being positioned to engage part of the latch element to prevent rotation of the latch element from the retaining position to the release position.

Advantageously, the plunger is operable by means of a Bowden cable.

Conveniently, the child safety seat is provided with two said latches.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 1 is a diagrammatic side view of part of a rear seat of a motor vehicle provided with an integrated child's safety seat in accordance with the invention, showing the seat in one condition with the child safety seat stowed, FIG. 2 is a view corresponding to FIG. 1 showing the child safety seat in the operative condition.

DETAILED DESCRIPTION OF THE INVENTION

Figure 3:
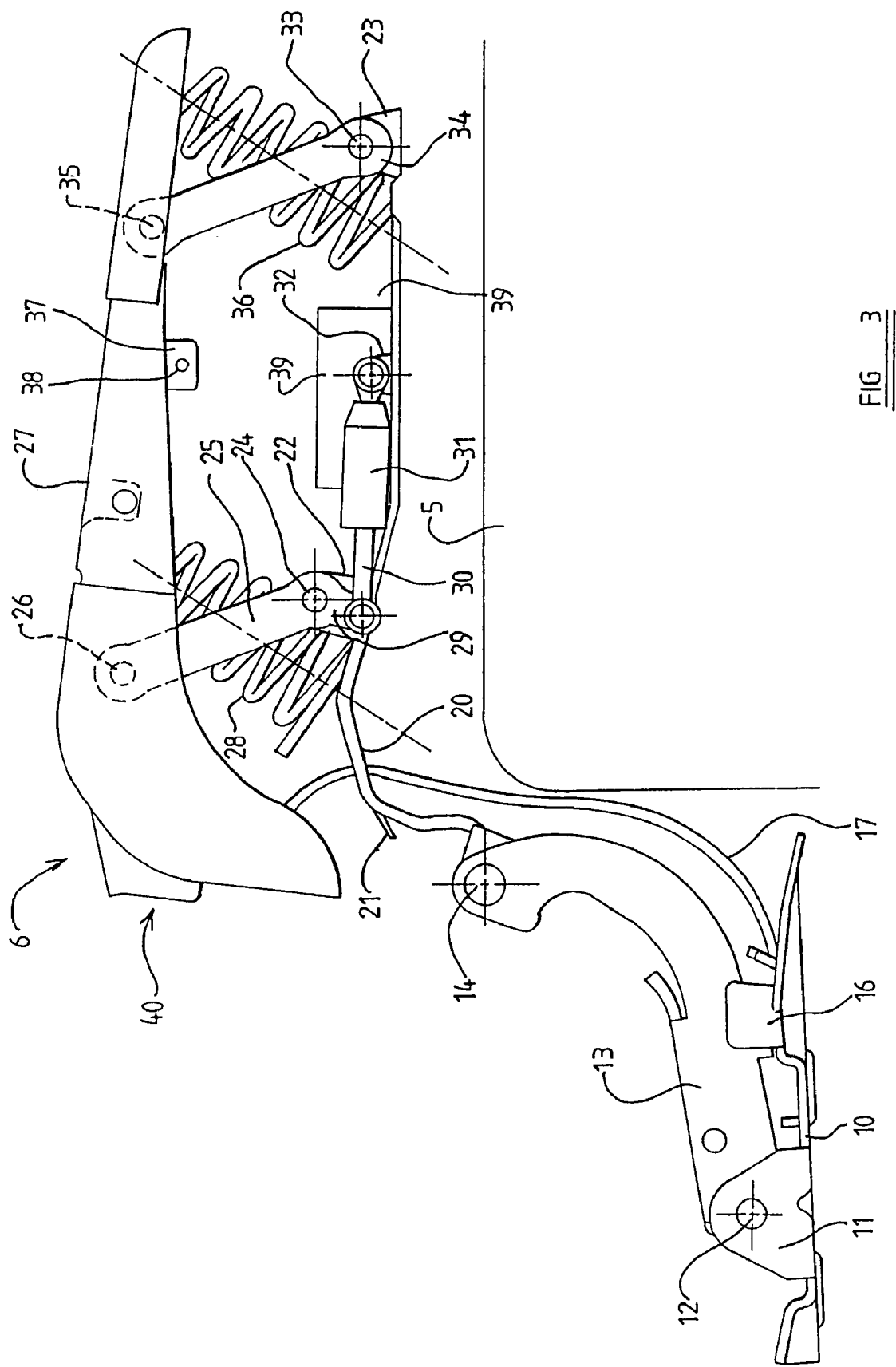
FIG. 3 is an enlarged view of part of the seat as shown in FIG. 2.

Referring initially to FIG. 1 of the accompanying drawings a vehicle seat 1 is provided, the seat having a squab structure 2 and a backrest 3, the seat being associated with a conventional safety belt 4 which is of the lap-and-diagonal form.

The squab section 2 of the seat is divided into two regions, a fixed rear region 5 and a moveable front region 6. The front region 6, as will become clear from the following description, can be moved from a stowed position, as shown in FIG. 1, in which the rear region 5 and the front region 6 together form a conventional squab, to an operative condition, as shown in FIG. 2, in which the front region 6 forms the squab of a child seat.

FIG. 3 illustrates the structure of the front part 6 of the squab section 2 of the seat.

Referring to FIG. 3 of the accompanying drawings, a mounting plate 10 is provided adapted to be secured to the frame underlying the squab section 2 of the seat. The mounting plate 10 is provided with two upwardly directed lugs 11 each of which supports, by means of a respective pivot pin 12, an arcuate arm 13. The arms 13 may pivot about the axis defined by the pivot pins 12. Each arm 13 is of arcuate form and terminates with a further pivot pin 14. The arm 13 is provided with a projecting latch pin 15 (see FIG. 4) which co-operates with a latch, shown schematically as latch 16 provided on the mounting plate 10. The latch 16 may be actuated by means of a Bowden cable 17. The catch serves to retain the arcuate arm 13 in the operative position illustrated in FIG. 3. The latch will be described in greater detail below.

The pivot pin 14 supports a mounting tray 20. The forward edge of the mounting tray 20 is pivotally mounted for pivotal movement about the axis defined by the pivot pins 14. The mounting tray extends, in the position illustrated, generally rearwardly from the pivot pins 14 in a substantially horizontal direction. The mounting tray is located above the rear part 5 of the squab unit of the seat.

A locking detent 21 is provided at the forward edge of the tray 20 in the region of the pivot pin 14 for the purpose which will be described hereinafter. The main, horizontal extending portion of the mounting tray 20 is provided with aligned pairs of upstanding lugs 22, 23. The first pair of aligned lugs 22, located forwardly on the mounting tray 20, are provided with aligned pivot pins 24 which support a first pair of linear links 25, the upper ends of the links 25 being pivotally connected by pivots 26 to a child supporting squab 27 which actually constitutes a principal element of the front portion 6 of the squab 2 of the seat 1 as shown in FIG. 1. The upper surface of the child supporting squab is padded and upholstered. The linear links 25 as shown in FIG. 3 are inclined slightly forwardly. A compression spring 28 is provided extending between the mounting tray 20 and the child supporting squab 27 in the region of the links 25, the axis of the compression spring being inclined slightly rearwardly relative to the axis of the links 25.

At least one of the links 25 is provided with a projecting finger or tab 29 which extends from the link and which is connected to a drive rod 30 which extends to a damper 31 which may, for example, be a hydraulic damper. The damper 31 is connected to the mounting tray 20 by means of a lug 32.

The second pair of aligned lugs 23, provided at the rear of the mounting tray are provided with aligned pivot pins 33, which support a second pair of linear links 34, the upper end of each linear link 34 being connected, by means of a pivot 35, to a rear part of the child supporting squab 27. The rear links 34 are inclined forwardly and thus parallel with the forward links 25. A further compression spring 36 is provided extending between the mounting tray 20 and the child supporting squab 27 in alignment with the rear links 34. The axis of the spring 36 is substantially parallel with the axis of the spring 28.

The child support squab 27 is provided with a depending arm 37 carrying a projecting latch pin 38. The latch pin is to be retained by a latch 39 mounted on the mounting tray 20 to secure the squab 27 to the tray 20. The latch 39 will be described in greater detail below.

The child supporting squab 27 is provided with an actuating button 40 provided towards the forward edge of the child supporting squab 27. The button 40 is adapted to actuate the Bowden cable 17 which releases the latch 16. The button 40 can also be actuated to release a retainer which is adapted to engage the detent 21 provided on support tray 20, as well as the latch 39 on the mounting tray 20.

Figure 4:
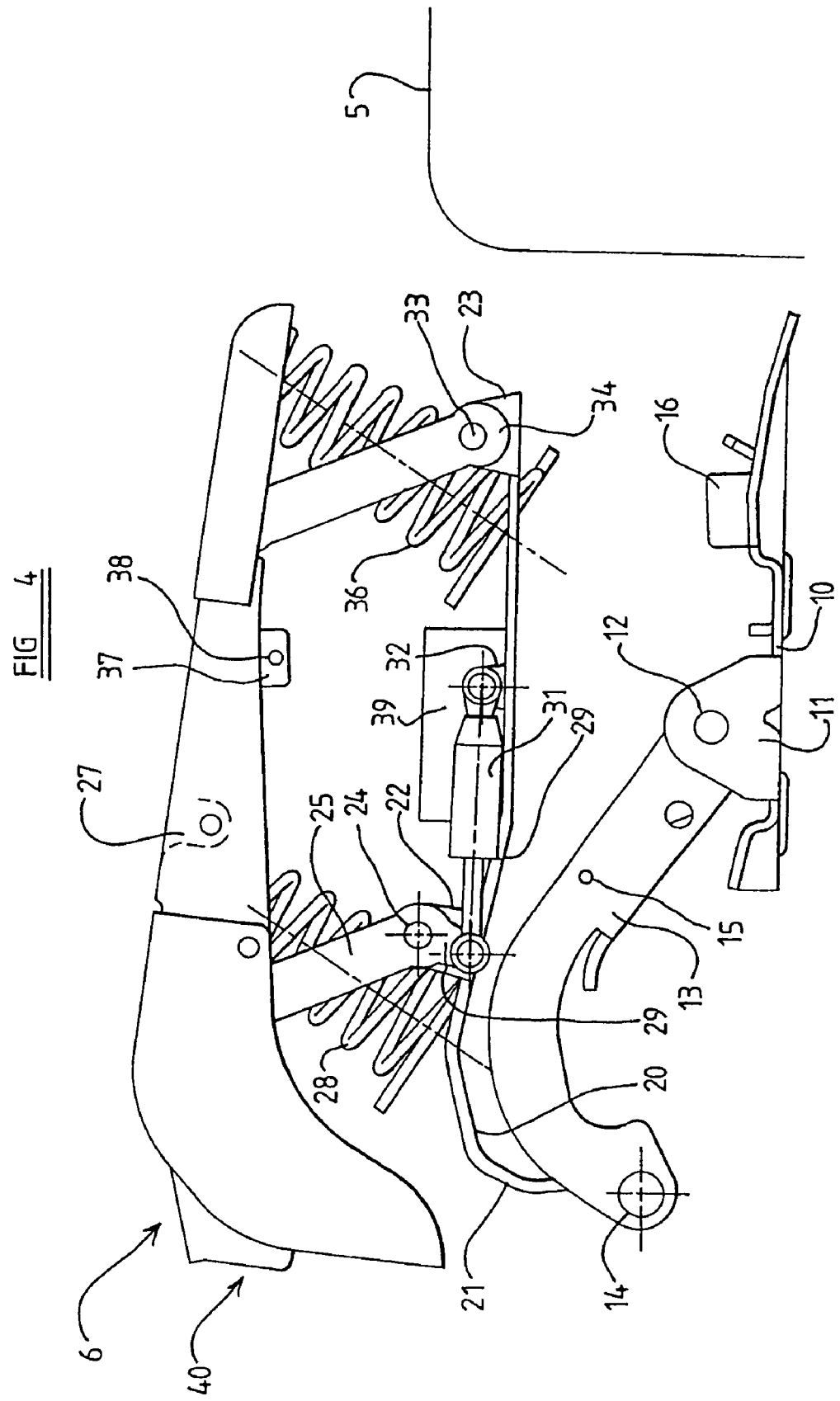
FIG. 4 is a view corresponding to FIG. 3 showing that part of the seat in an alternative condition.
Figure 5:
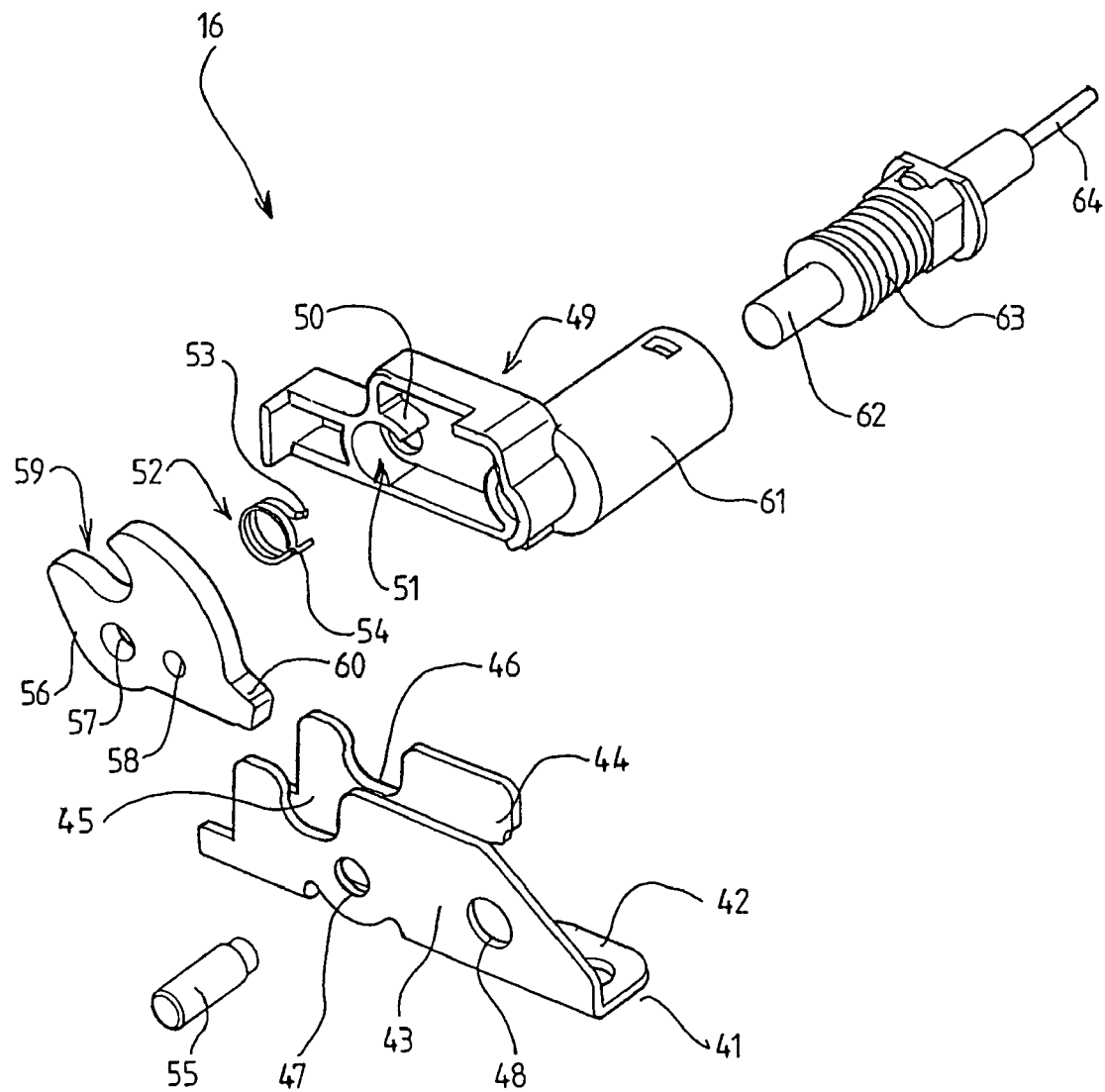
FIG. 5 is an exploded view of the latch as shown in FIGS. 3 and 4.

It is to be appreciated that the described child supporting squab 27 is illustrated in FIG. 3 in the operative position. It is to be understood that if the actuating button 38 is actuated, the latch pin 15 may be released by the latch 16 and the entire child supporting squab may be pivoted forwardly, with the arcuate arms 13 pivoting about the pivot axis defined by the pivot pins 12 and with the child supporting squab pivoting about the pivot axis 14. The arrangement may then occupy the position as shown in FIG. 4. It will be appreciated that with a slight further movement the illustrated components will be in such a position that the child supporting squab 27 again constitutes the front section 6 of the squab 2 of the seat. It has, of course, been known previously to provide a child supporting squab which can move pivotally, in this way, between an operative position and a stowed position, and vice versa.

In the described embodiment of the invention, the child supporting squab 27 is mounted on the support tray by means of a parallel arm linkage constituted by the arms 25 and 34, and is biased upwardly by means of the compression springs 28 and 36. When the arrangement is to be in the stowed condition shown in FIG. 1 manual pressure is applied to the child supporting squab 27 thus compressing the springs 28 and 36 until a catch actuated by the button 40 engages the detent 21 provided on the support tray 20 and the latch pin 38 is retained in the catch 39 thus retaining the child supporting squab 27 in a predetermined position relative to the support tray 20. However, when the child safety seat is to be used by a child, the components are moved to the position illustrating in FIG. 3 and the catches operated by the button 40 are released so that the child supporting squab 27 is moved to an elevated position relative to the support tray 20 by the springs 28 and 36.

In the foregoing description, reference has been made to two latches, latch 16 and latch 39 each of which is to engage and retain a co-operating latch pin in form, respectively, of latch pin 15 and the latch pin 38. Each of the two catches, in this embodiment of the invention, are of identical design and thus only one latch in the form of latch 16, will be described. The latch 16 comprises a support plate 41. The support plate 41 has a base 42 and two upstanding side walls 43, 44 which are spaced apart to form an open topped channel. A "U" shaped recess 45 is formed in the upper part of the first side wall 43 and a corresponding "U" shaped recess 46 is provided in the second side wall 44 in alignment with the first recess 45. A first aperture 47 is provided in the side wall 43 at a position adjacent the base of the "U" recess 45. A corresponding aperture (not shown) is defined in the second side wall 44, the two apertures being in alignment.

The first side wall 43 extends away from the "U" shaped recess 45 by a greater extent than does the side wall 44. A further aperture 48 is provided in the portion of the side wall 43 which extends beyond the end of the side wall 44.

A further opening is provided in the side wall 44 (not shown) for the purpose that will be described herein after this paragraph. A spring housing 49 is provided adapted and configured to be abut against the side wall 44. The spring housing has an aperture 50 therein to be co-aligned with the aperture 47 is the first side wall 43 and the co-aligned aperture in the second side wall 44. The interior of the housing 49 defines a cylindrical cavity 51 adjacent the aperture adapted to receive a torsion spring 52. The torsion spring 52 has a first projecting end 53 adapted to engage part of the housing and a second projecting end 54 adapted to pass through the said opening in the side wall 44 into the space between the two side walls.

A pivot pin 55 is provided to pivotally support a latch element 56 within the channel. A latch element is in the form of a plate having an aperture 57 therein. The plate is configured to be inserted between the two upstanding side walls 43, 44 with the pivot pin 55 passing through the aperture 47, through the aperture 57 formed in the latch element 56, through aperture formed in the upstanding wall 44, through the central part of the torsion spring 52, and through the aperture 50 and in the spring housing 49. The end 54 of the torsion spring 52 passes through the opening in the side wall 54 to engage a second aperture 58 formed in the latch plate 56. To one side of the aperture 57 the latch plates define a "U" shaped slot or recess 59 and to the other side defines a projecting tongue 60.

Connected to the spring housing 49 is a cylindrical plunger housing 61 which contains a plunger 62 which is biased by means of a spring 63 but which can be retraced by means of Bowden cable 64. The plunger 62 is in alignment with the aperture 48 formed in the first side wall 43 and when extended engages the aperture 48.

When the components are assembled, the latch element 56 may move pivotally, against a bias imparted thereto by the torsion spring 52 about an axis defined by the pivot pin 55. The tongue 60 is in that part of the channel adjacent the aperture 48 and the "U" shaped recess 59 is in that part of the channel which defines the two identical "U" shaped recesses 45 and 46 as formed in the side walls 43 and 44.

Figure 6:
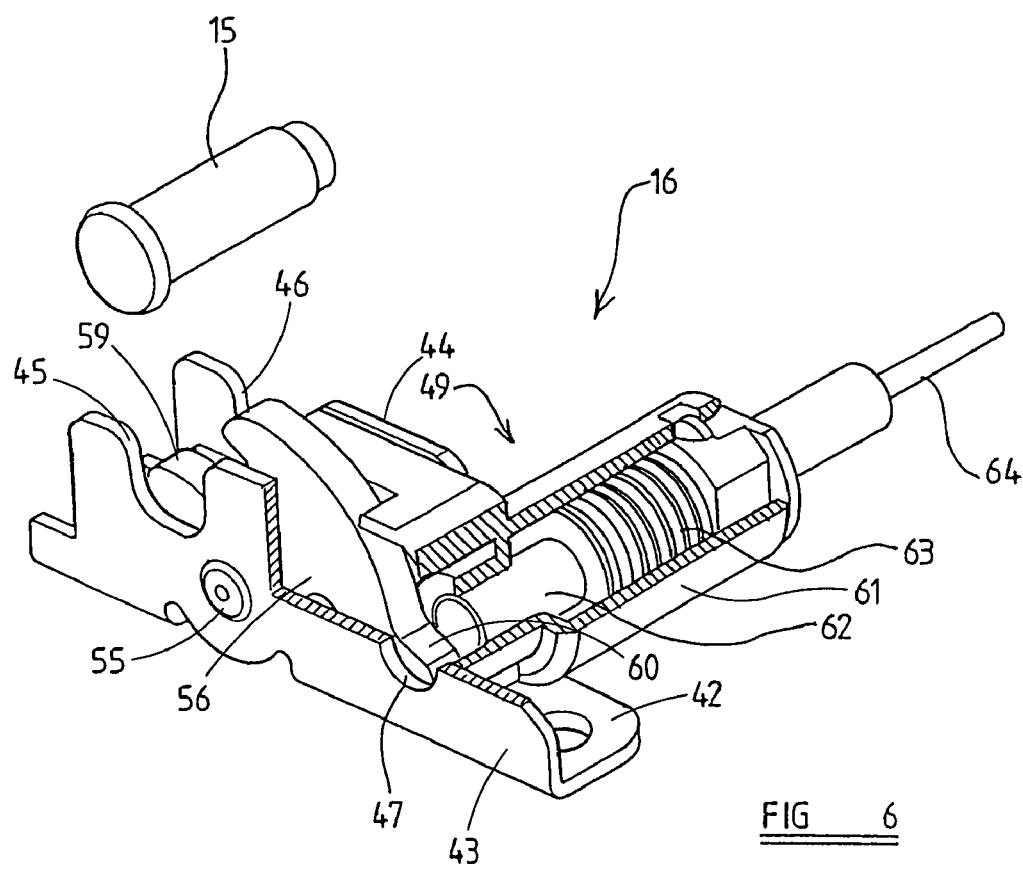
FIG. 6 is a partially broken away view of the latch of FIG. 5 in the release position.

FIG. 6 shows the catch in the release position. The plunger 62 has been withdrawn and does not traverse the channel. Consequently the latch element is free to rotate, and it can be seen that the tongue 60 provided at the end of the latch element may move between the end of the plunger 62 and the aperture 48 formed in the upstanding side wall 43.

The latch element is biased, by the spring 52, to move in a clockwise direction as shown in FIG. 6 so that the "U" shaped recess is elevated and presents an open mouth above the top of the "U" shaped recesses 45 and 46. The mouth may receive the latch pin 15 which is shown in an initial position just above the latch 16.

Figure 7:
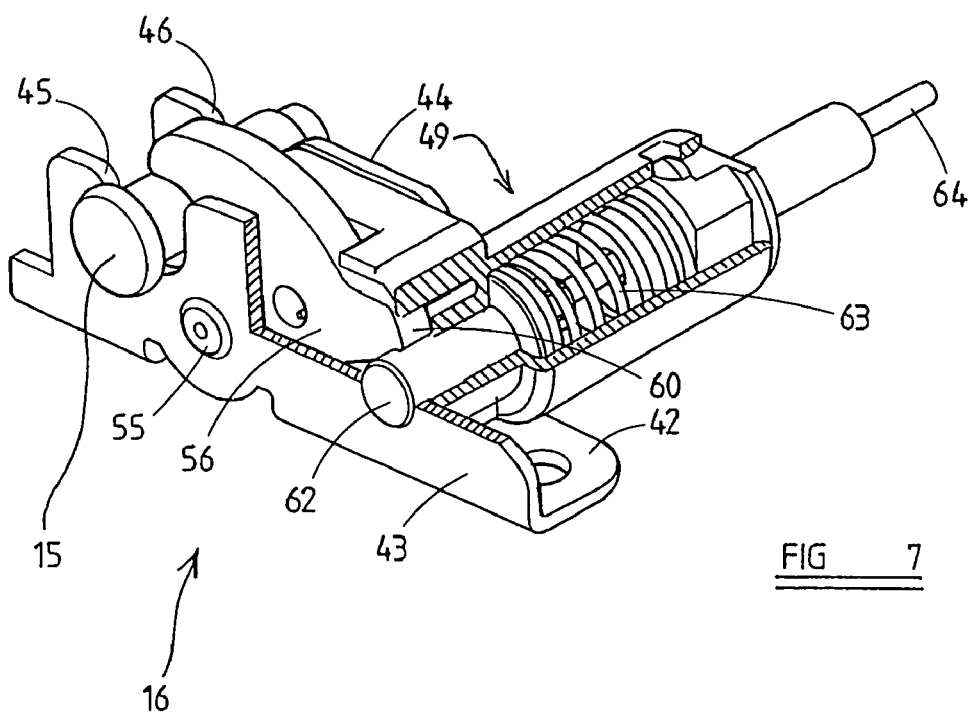
FIG. 7 is a view of the catch in the retaining position.

It is to be appreciated that as the latch pin 15 is inserted into the open mouth of the "U" shaped recess 59 in the latch element 56, the latch element will rotate against the biased imparted by the spring, moving the pin downwardly. The pin enters the "U" shaped recesses 45 and 46. As the latch plate continues to move, the tongue 60 moves out of the region between the end of the plunger 62 and the aperture 48 and under the bias imparted thereto by the spring 63. The plunger moves across the channel, so that the end of the plunger becomes inserted in the aperture 48, as can be seen in FIG. 7, the plunger thus extending under the tongue 60 and preventing movement of the latch element in the counter-clockwise direction. The latch pin 15 is thus securely trapped by the combination of the "U" shaped recesses in the channel defined by the upstanding walls 43 and 44 and the "U" shaped recess 59 formed in the latch 56. Even if subjected to "G" forces, the latch will not be removed since the spring 63 is selected to be sufficiently strong as to resist movement of the plunger 62 due simply to acceleration forces applied to the plunger 62. Indeed the plunger 62 may be made to have a very low mass.

When the latch is to be released, tension is applied to the Bowden cable 64, thus withdrawing the plunger 62 against the resilient bias applied transversely of the axis of the channel by the spring 63. As the plunger is moved to the retracted position shown in FIG. 6, the latch element 56 is again free to rotate, as the plunger no longer engages the tongue on the latch element, and the latch element can rotate to the position shown in FIG. 6, thus releasing the latch pin 15.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the above description constitutes the preferred embodiment of the present invention, it will be appreciated that the invention is susceptible to modification, variation and change without departing from the proper scope and fair meaning of the accompanying claims.

I claim:

1. A child safety seat, of the type being incorporated in the squab of a vehicle seat and having a part of the squab which can move to an elevated position, the child safety seat comprising at least one latch to maintain two components of the seat in a predetermined relative position, a first of the two components carrying the latch and a second of the components carrying a latch pin to co-operate with the latch, the latch defining a channel between two side walls, the side walls being provided with side wall recesses therein, the channel containing a pivotally mounted latch element, the latch element defining a latch recess therein, the latch element being moveable pivotally between a first release position in which the latch recess can receive the latch pin, to enable the latch pin to be inserted into the latch recess and being moveable to a second retaining position in which the latch pin, retained by the latch recess, is further retained in the side wall recesses, a release mechanism being provided to retain the latch element in the retaining position, wherein the release mechanism incorporates a plunger moveable against a resilient bias transversely of the axis of the channel, the plunger being positioned to engage part of the latch element to prevent rotation of the latch element from the retaining position to the release position.

2. A child safety seat according to claim 1 wherein the plunger is operable by means of a Bowden cable.

3. A child safety seat according to claim 1 comprising the seat provided with two latches.

4. A child safety seat according to claim 1 in which the two components of the seat includes a fixed rear squab section and a moveable front squab region.

5. A child safety seat according to claim 4 wherein the latch is affixed to the fixed rear section of the squab and the latch pin is affixed to the moveable front squab section.

6. A child safety seat according to claim 4 wherein the moveable front section carries the latch pin, and the fixed rear section carries the latch.

7. A child safety seat according to claim 4 wherein the moveable front squab section includes a mounting tray and the mounting tray is affixed to the moveable front squab section by pairs of links, allowing the front squab section to move vertically against force exerted by a compression spring relative to the mounting tray, and wherein the latch is used to maintain the front squab section in a condition compressed against the mounting tray against the force exerted by the compression spring.

8. A child safety seat according to claim 4 wherein the moveable front squab section is moveable from a stowed position and the elevated position, and wherein the latch maintains the front squab section in the elevated position.

* * * * *